United States Patent
Gutermuth et al.

(10) Patent No.: US 9,746,847 B2
(45) Date of Patent: Aug. 29, 2017

(54) OPERATING ARRANGEMENT

(75) Inventors: Uwe Gutermuth, Darmstadt (DE); Thorsten Alexander Kern, Alsbach (DE); Robert Wolfgang Kissel, Egelsbach (DE); Sabine Vorberg, Goldbach (DE); Ingo Zoller, Hoesbach (DE)

(73) Assignee: Continental Automotive GmbH, Hannover (DE)

( * ) Notice: Subject to any disclaimer, the term of this patent is extended or adjusted under 35 U.S.C. 154(b) by 675 days.

(21) Appl. No.: 14/342,982

(22) PCT Filed: Aug. 30, 2012

(86) PCT No.: PCT/EP2012/066861
§ 371 (c)(1),
(2), (4) Date: Mar. 5, 2014

(87) PCT Pub. No.: WO2013/034483
PCT Pub. Date: Mar. 14, 2013

(65) Prior Publication Data
US 2014/0207268 A1 Jul. 24, 2014

(30) Foreign Application Priority Data
Sep. 5, 2011 (DE) .................. 10 2011 082 143

(51) Int. Cl.
*G06F 3/041* (2006.01)
*G05B 19/402* (2006.01)
(Continued)

(52) U.S. Cl.
CPC ............. *G05B 19/402* (2013.01); *G05G 5/03* (2013.01); *G06F 3/016* (2013.01)

(58) Field of Classification Search
USPC .................. 715/701–702; 340/407.1–407.2; 345/156–184
See application file for complete search history.

(56) References Cited

U.S. PATENT DOCUMENTS

| | | | |
|---|---|---|---|
| 5,894,263 A * | 4/1999 | Shimakawa | G08B 6/00 340/384.1 |
| 6,777,895 B2 * | 8/2004 | Shimoda | H02K 33/16 318/114 |

(Continued)

FOREIGN PATENT DOCUMENTS

DE 102010007486 A1 * 8/2011 ............. G06F 3/016

*Primary Examiner* — Roberto Flores
(74) *Attorney, Agent, or Firm* — Cozen O'Connor

(57) ABSTRACT

An operator control device includes an operator control element configured to provide haptic feedback to an operator. The operator control element is activatable by an input member of the operator and has: a first planar component; and a second planar component oriented in parallel with the first planar component, the first and second planar components being movable relative to one another. The first and second planar components are guidable between a position of rest and an activation position while maintaining their parallel orientation with respect to one another. In the activation position the distance between the first and second planar components is smaller than in the position of rest. The first and second planar components are spring loaded in the position of rest.

11 Claims, 7 Drawing Sheets

(51) Int. Cl.
*G05G 5/03* (2008.04)
*G06F 3/01* (2006.01)

(56) References Cited

U.S. PATENT DOCUMENTS

| | | | | |
|---|---|---|---|---|
| 7,038,335 | B2* | 5/2006 | Choi | H02K 33/16 |
| | | | | 310/12.24 |
| 7,525,403 | B2* | 4/2009 | Kim | B06B 1/045 |
| | | | | 310/12.22 |
| 2002/0149561 | A1* | 10/2002 | Fukumoto | G01C 21/3664 |
| | | | | 345/156 |
| 2006/0109256 | A1* | 5/2006 | Grant | G06F 3/016 |
| | | | | 345/173 |
| 2006/0256075 | A1* | 11/2006 | Anastas | G06F 3/016 |
| | | | | 345/156 |
| 2008/0202824 | A1* | 8/2008 | Philipp | G06F 3/02 |
| | | | | 178/18.01 |
| 2009/0167722 | A1* | 7/2009 | Villain | G06F 3/011 |
| | | | | 345/174 |
| 2009/0244017 | A1* | 10/2009 | Pala | B60K 35/00 |
| | | | | 345/173 |
| 2010/0033443 | A1* | 2/2010 | Hashimoto | G06F 3/0418 |
| | | | | 345/173 |
| 2011/0096013 | A1* | 4/2011 | Krumpelman | G06F 3/016 |
| | | | | 345/173 |
| 2011/0260560 | A1* | 10/2011 | Park | H02K 33/16 |
| | | | | 310/25 |
| 2011/0291947 | A1* | 12/2011 | Pemberton-Pigott | G06F 1/1643 |
| | | | | 345/173 |
| 2012/0306798 | A1* | 12/2012 | Zoller | G06F 3/016 |
| | | | | 345/173 |
| 2013/0285801 | A1* | 10/2013 | Jung | G06F 3/016 |
| | | | | 340/407.2 |

\* cited by examiner

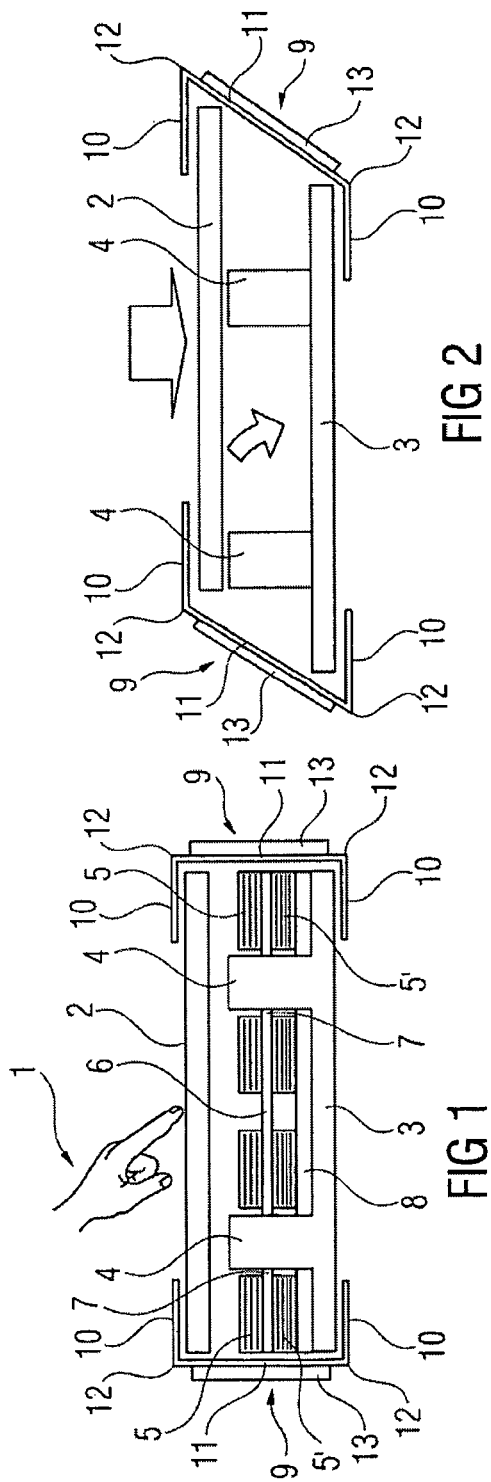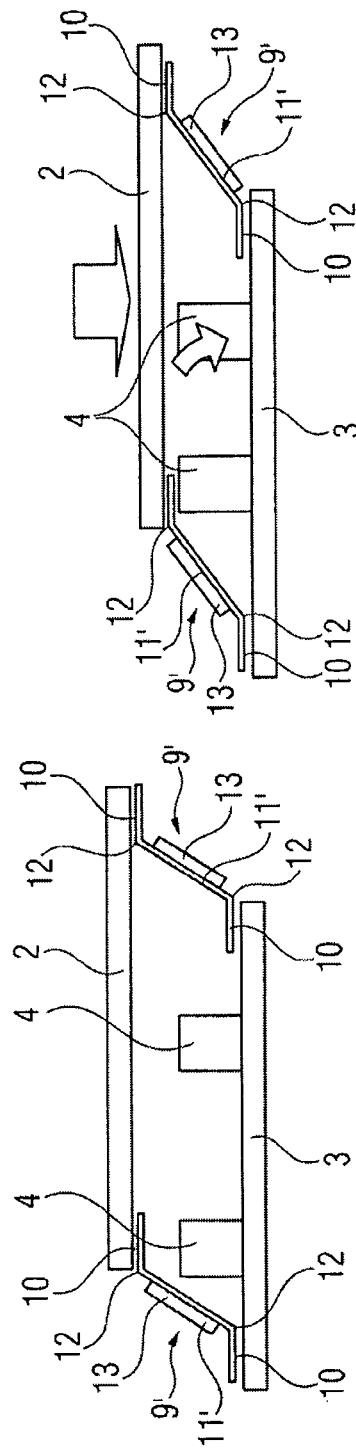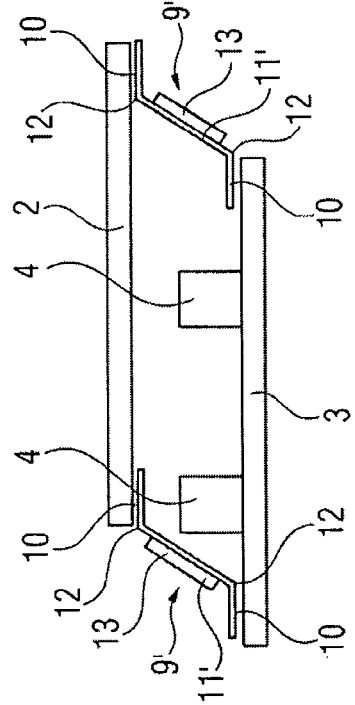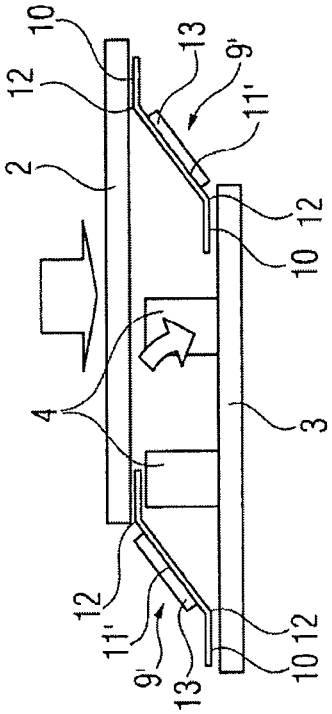

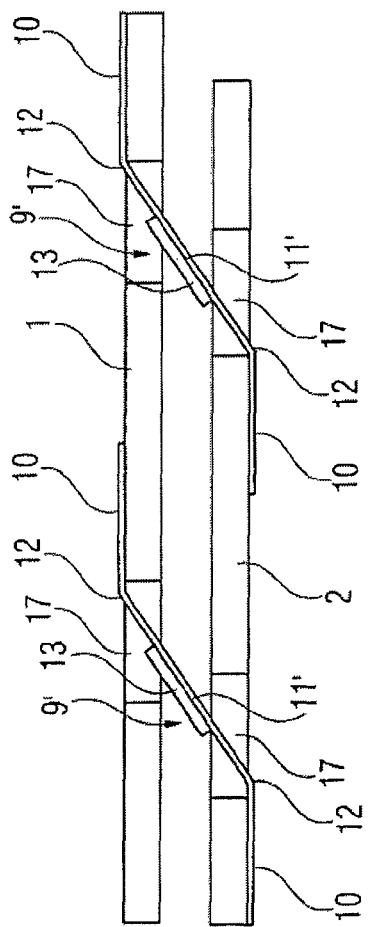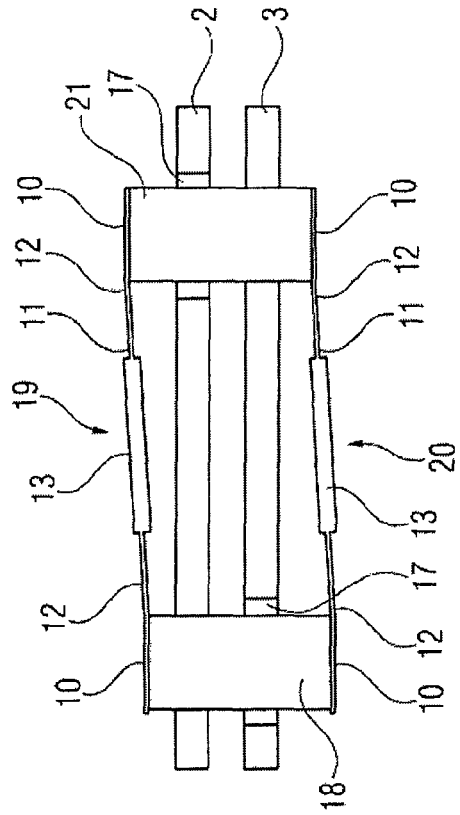

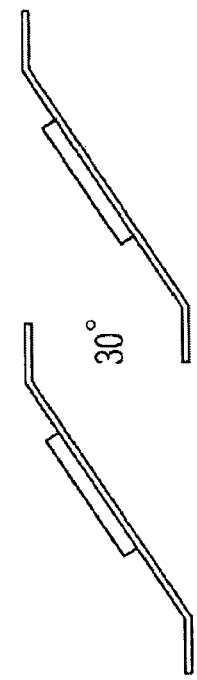
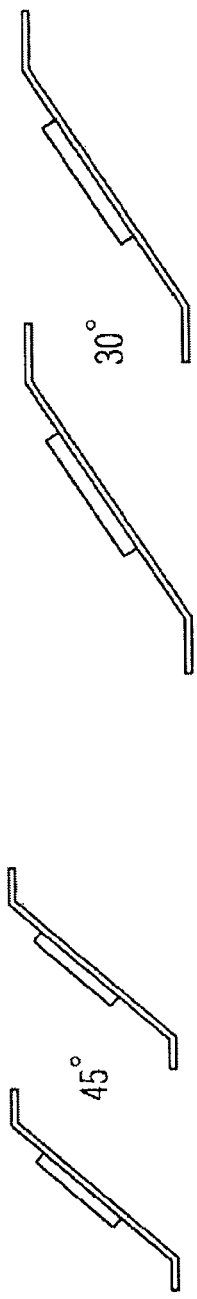
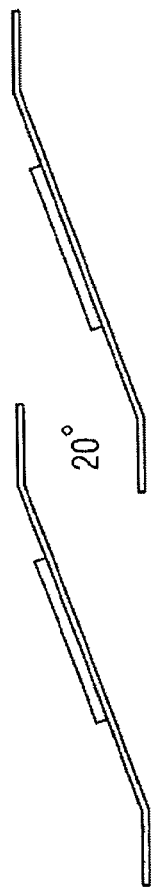

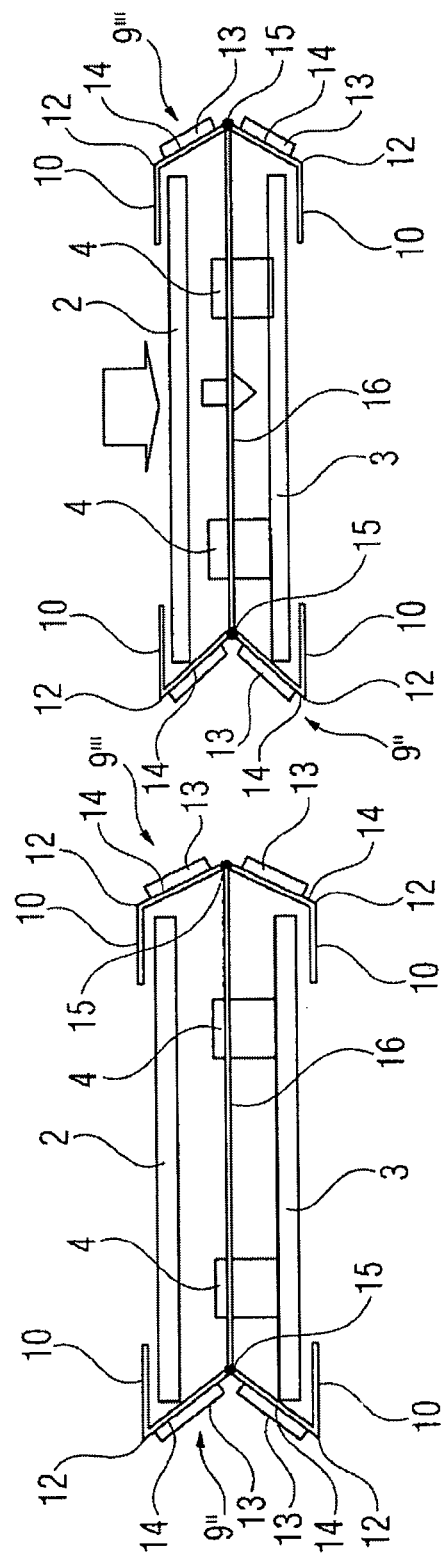

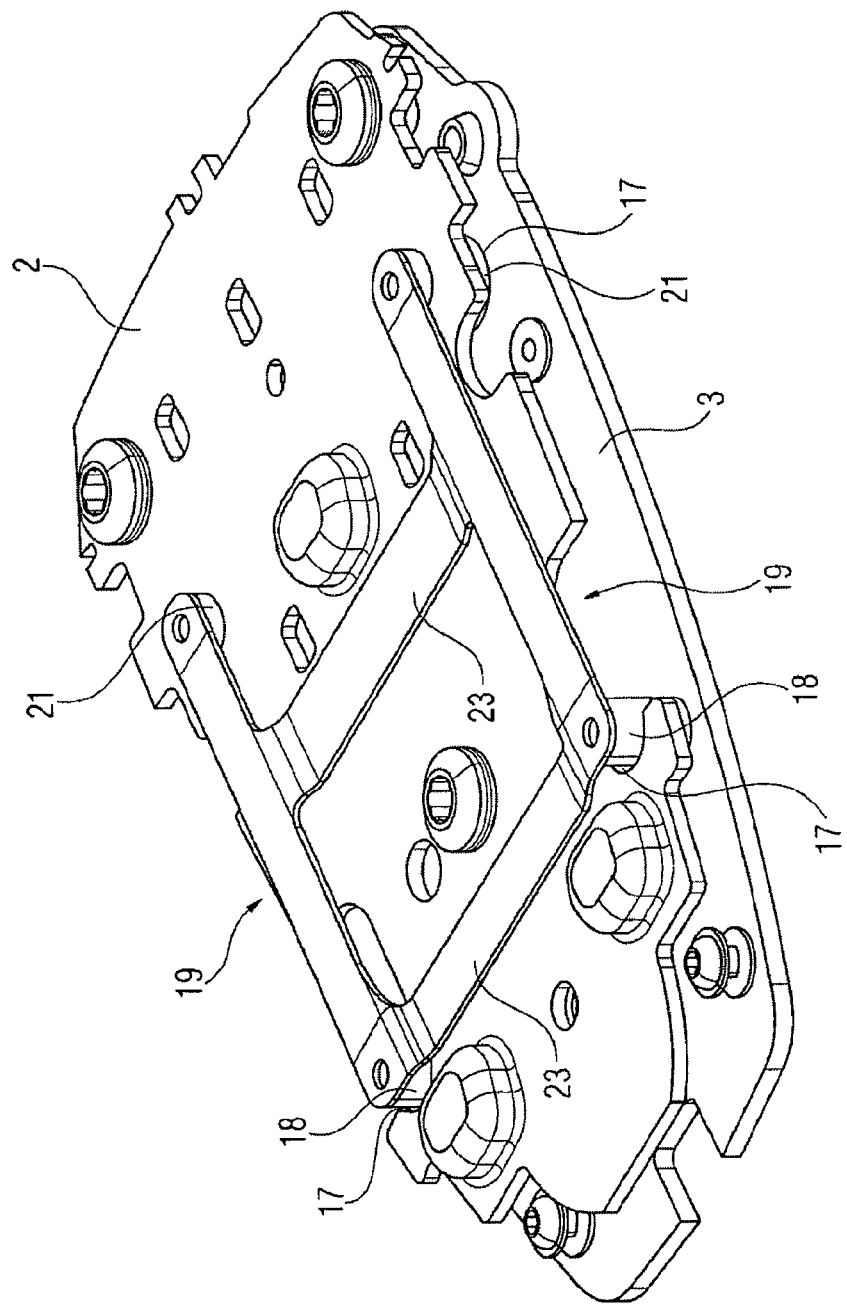

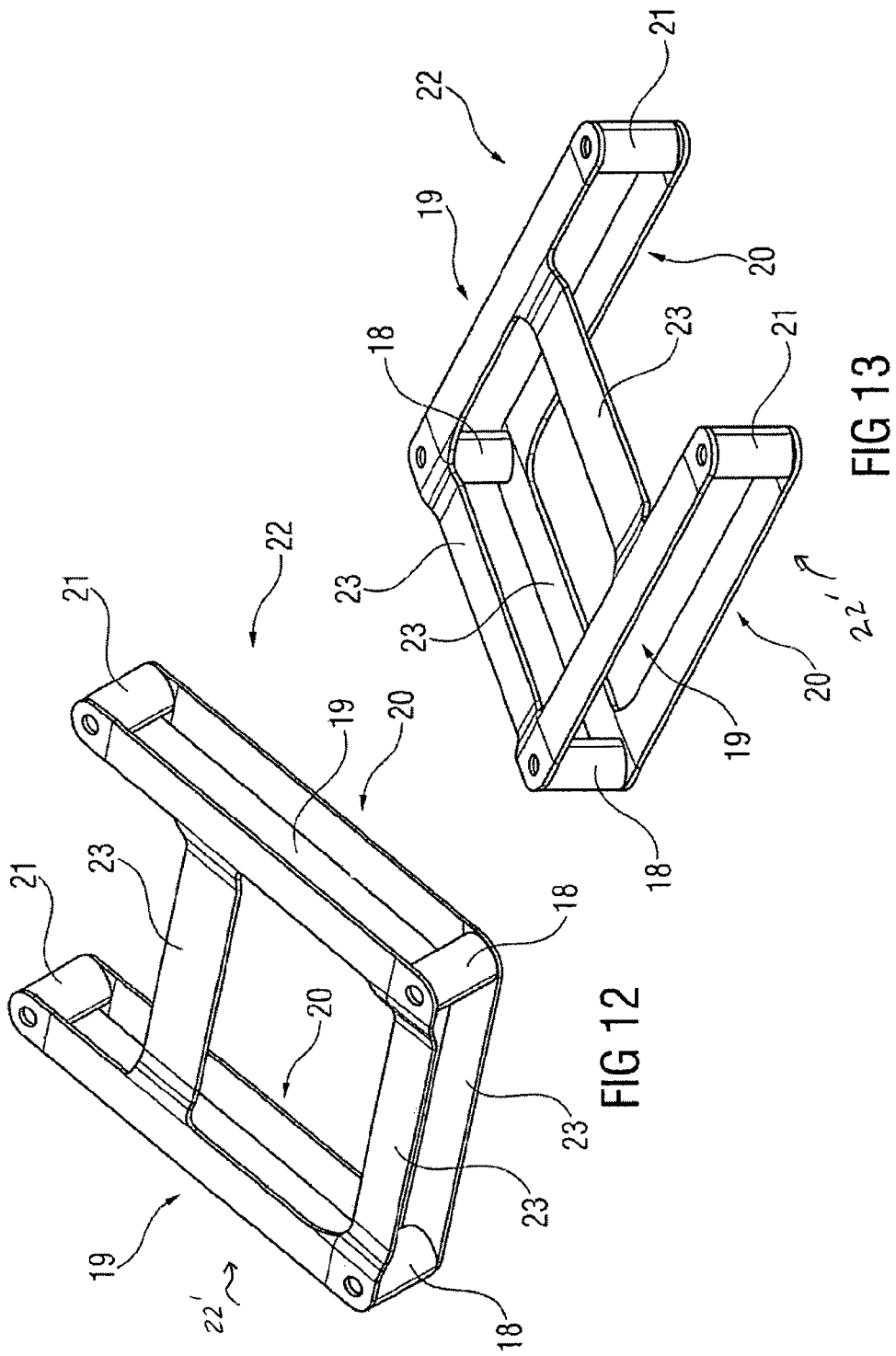

OPERATING ARRANGEMENT

CROSS-REFERENCE TO RELATED APPLICATIONS

This is a U.S. national stage of application No. PCT/EP2012/066861, filed on 30 Aug. 2012, which claims priority to the German Application No. 10 2011 082 143.0, filed 5 Sep. 2011, the content of both incorporated herein by reference.

BACKGROUND OF THE INVENTION

1. Field of the Invention

The invention relates to an operator control device having an operator control element with haptic feedback, wherein the operator control element can be activated by an operator by an input member, the operator control element having a first and a second planar component oriented parallel to one another with respect to their large surfaces and movable relative to one another, wherein the first planar component forms the operator control element or transmits its movement entirely or partially to the operator control element.

2. Related Art

Haptic feedback of operator control elements is required, in particular, when an operator cannot directly perceive the operator control process that he is carrying out. In the case of operator control apparatuses with electromechanical switches an operator can perceive the opening or closing of the switching contacts through changing haptics of the operator control element. However, this is not necessarily the case with electronic switches. For this reason, in the prior art operator control elements are known that use movements of the operator control element that can be perceived by the operator to provide haptic feedback about an operator control process that has taken place. The known haptic operator control elements, for example for what are referred to as touchscreens, require a large installation space, a complex drive and, in particular, structural measures if the haptic operator control elements are to be used, for example, in an environment subject to particularly large temperature differences such as is the case, for example, in a motor vehicle, which must maintain its functional capability in extreme cold as well as in the heat of the summer.

In order to obtain a defined force/travel characteristic curve in the case of the ferromagnetic planar component or components, the ferromagnetic component or components, which can be moved by an application of force, need to be guided in parallel. This guiding must permit the parallel arrangement even in the case of off-center application of force and should, in particular, minimize or avoid tilting of the ferromagnetic planar component or components.

In the case of an operator control apparatus of the aforementioned type it is known to guide the ferromagnetic planar component or components in a sliding guide that extends beyond the depth of the ferromagnetic planar component or components. The contact points of the sliding guide are determined in terms of depth and position as a function of the expected forces and the maximum off-center introduction of force. For this reason, in the case of such guidance a low installation space is necessary. Furthermore, the haptic impression when the operator control device is activated is influenced adversely by the friction in the guiding means.

SUMMARY OF THE INVENTION

An object of the invention is to enable haptic feedback that is at least largely uninfluenced by guiding structure while requiring little installation space and having a simple flat design.

This object is achieved according to one aspect the invention in that the planar components are guided between a position of rest and an activation position while maintaining their parallel position with respect to one another, wherein in the activation position the distance between the two planar components is smaller than in the position of rest, and the two planar components are spring loaded in their position of rest.

In this context, during their movement between the position of rest the planar components can be shiftable in their planes relative to one another in addition to the movement that reduces the distance between the planar components.

As a result, in the case of a parallel movement of the planar components there is no need for a guiding structure that requires a large installation depth, with the result that the installation depth, and therefore the requirement for installation space by the operator control device, can be kept small.

Furthermore, in another aspect, the planar components are always kept parallel to one another and, in particular, avoid friction influences, which are dependent on the respective type of application of force.

The haptic feedback therefore also remains independent of the friction influences, and sensitive owing to the movement of the first planar component.

In one aspect, the two planar components are drivable by an actuator counter to the spring force such that they can be moved out of their position of rest into their activation position.

In another aspect, in a simple configuration that requires little installation space, the planar components can be composed entirely or partially of a ferromagnetic material and at least one coil can be arranged between the planar components, wherein by energizing the coil the planar components can be moved with relative displacement in their planes with respect to one another such that their distance from one another is reduced.

In one aspect, a particularly small installation height is achieved if the coil is a flat coil arranged on a printed circuit board.

If the first planar component and the second planar component are connected to one another by two connections each directly or indirectly attached at the same distance and in the same direction in the extent of the planes of the planar components to the first planar component by their one attachment end and to the second planar component by their other attachment end, extend parallel to one another between their attachment ends and have spring-elastic regions near to the attachment ends, and are of flexurally rigid design in their connecting region between the attachment ends, wherein the spring-elastic regions exert on the planar components a prestress moving away from one another, both parallel guidance of the planar components and resetting into the position of rest are brought about by the same components, and therefore in a way which is economical in terms of components.

For this purpose, according to one aspect of the present invention, the first planar component can have as a connection a first connecting piece to whose end directed toward the operator the first attachment end of a first connecting element is attached, and to whose end projecting away from the operator the first attachment end of a second connecting element is attached, and the second planar component has as a connection a second connecting piece to whose end projecting away from the operator the second attachment end of the second connecting element is attached, and to whose end directed toward the operator the second attachment end of the first connecting element is attached, wherein the end, projecting away from the operator, of the first connecting piece can project with play through an opening in the second planar component, and the end, projecting toward the operator, of the second connecting piece can project with play through an opening in the first planar component.

Tilting transversely with respect to the direction of extent of the connecting element is avoided by virtue of the fact that, according to another aspect, a second identical connecting unit is arranged parallel to a connecting unit composed of first and second connecting pieces and first and second connecting elements, wherein the first connecting elements and/or the second connecting elements of the two connecting units are connected to one another by one or more rigid crossmembers.

In a further aspect of the invention, the connecting regions can extend at a right angle to the plane of the planar components when the flat coil is not energized and can extend at an incline with respect to the plane of the components when the flat coil is energized.

If the connecting regions extend with a greater incline with respect to the plane of the planar components when the flat coil is not energized than when the flat coil is energized, the direction of movement of the moved planar components is converted to a greater extent to a normal with respect to the plane of the aligned movement, the greater the incline already in the position of rest.

A direction of movement of the moved planar components only at a right angle to the plane of the planar components is brought about if the connecting regions are composed of two flexurally rigid connecting partial regions connected to one another via a further spring-elastic region and extending at an incline with respect to the plane of the planar components at angles whose sum is a complementary angle with respect to the plane of the planar components, and which connecting partial regions are connected to one another via a coupling element extending parallel to the plane of the planar components.

Manufacture is particularly easy and the necessary components are reduced if the connecting elements are embodied as a punched bent part made of sheet metal.

In this context, the connecting regions and connecting partial regions are easily embodied in a flexurally rigid fashion by virtue of the fact that, according to one aspect, the connecting elements are bent out of the plane of the sheet metal in the connecting region or in the connecting partial regions along the longitudinal edges between the spring-elastic regions or between the spring-elastic regions and the further spring-elastic region.

Another flexural rigidity of the connecting regions and connecting partial regions which can likewise be achieved in a simple manner is brought about if the connecting elements have one or more impressions extending along their longitudinal extent between the spring-elastic regions, in the connecting region or in the connecting partial regions.

In order to further minimize the structural height of the operator control device, in another aspect, the printed circuit board that supports the flat coil can be fixedly arranged on the surface of the second planar component facing the first planar component.

As a result, the printed circuit board no longer has to have such rigidity that it supports the flat coil in a dimensionally stable, planar fashion since it now receives its dimensionally stable property from the dimensionally stable, first planar component.

The thickness of the printed circuit board now only has to ensure reliable insulation with respect to the second planar component and can therefore be minimized.

The evenness of the printed circuit board, brought about by the first planar component, the avoidance of undulations in the printed circuit board and the small thickness thereof permit the distance between the two planar components, and therefore also the overall structural height of the operator control device, to be given small dimensions and relatively large actuating forces to be generated with a given amount of available energy.

By virtue of the energization of the coil, a magnetic field is generated and the two planar components are pulled toward one another.

This movement can be perceived directly or indirectly by the input member such as, for example, a finger of an operator.

The flat coil can be manufactured in a particularly easy and durable fashion if it is composed of conductor tracks arranged on the printed circuit board. In this context, the printed circuit board can be copper laminated and etched in such a way that the conductor tracks are left in a preferably spiral-shaped coil track.

Instead of the etching of the conductor tracks, they can also be generated, for example, by imprinting the printed circuit board with a conductor track material such as silver paste.

In order to concentrate the magnetic flux, the flat coil preferably has a coil former which extends at a right angle with respect to the plane of the planar components.

Owing to the short distance between the two planar components, the height of the pole shoe is also small. Furthermore, owing to the small tolerances that have to be maintained, the pole shoe can extend to near the first component, as a result of which the magnetic flux is increased.

If the coil former is embodied in this context in one piece with one of the planar components, the number of components and the outlay on mounting are reduced.

In order to attach the printed circuit board to the second planar component over a surface, the printed circuit board can be, in according with an aspect of the present invention, arranged on the second planar component by an adhesive layer.

A further reduction in the structural height is achieved by virtue of the fact that the printed circuit board is, in another aspect, applied to the second planar component using film technology, in particular using thick film technology.

In another aspect, the second planar component is arranged in a nonmovable fashion, with the result that when the flat coil is energized only the first component is moved in the direction of the second planar component.

In order to move the planar components into their position of rest when the flat coil is not energized, the first planar component and the second planar component can be, in another aspect, movable away from one another by a spring element up to a specific maximum distance when the flat coil is not energized, wherein in a simple embodiment the maximum distance between the two planar components is determined by stops.

The operator control element can be, in one aspect, embodied as a display. This display can be configured in the simplest case, for example, by printing with various numerals in the form of a telephone keypad. As a result, for example various numerals can be selected when the operator control element is touched on the corresponding numeral with the operator control member and the display has a corresponding apparatus with which the position of the input member on the display can be determined.

In this context, in another aspect, the display can be embodied as an electro-optical display in which, for example, various menus, submenus or individual values can be displayed on the display, which values are then detected by correspondingly touching the display at the corresponding position of the depiction of the menu, submenu or value to be selected. Such optoelectronic displays can be embodied, for example, as a light emitting diode matrix, an organic light emitting diode display or a liquid crystal display and are already known as what are referred to as touchscreens.

The flat coils are energized with a direct current or a low-frequency alternating current in order to move the planar components with respect to one another. In addition, this current can be modulated with a frequency in the audible range which is, for example, 1 kilohertz, with the result that this frequency can additionally be heard. It is therefore possible to hear a click which sounds as if an electromagnetic switch has been opened or closed.

BRIEF DESCRIPTION OF THE DRAWINGS

Exemplary embodiments of the invention are illustrated in the drawings and will be described in more detail below. In the drawings:

FIG. 1 shows a sectional side view of a first exemplary embodiment of an operator control device in a position of rest in which it is not energized;

FIG. 2 shows the operator control device according to FIG. 1 in an activation position in which it is energized;

FIG. 3 shows a sectional side view of a second exemplary embodiment of an operator control device in a position of rest in which it is not energized;

FIG. 4 shows the operator control device according to FIG. 3 in an activation position in which it is energized;

FIG. 5 shows a sectional side view of a third exemplary embodiment of an operator control device in a position of rest in which it is not energized;

FIGS. 6a-6d show four exemplary embodiments of connecting elements 6a-6d in a position of rest;

FIG. 7 shows a sectional side view of a fourth exemplary embodiment of an operator control device in a position of rest in which it is not energized;

FIG. 8 shows the operator control device according to FIG. 7 in an activation position in which it is energized;

FIG. 9 shows a sectional side view of a fifth exemplary embodiment of an operator control device in a position of rest in which it is not energized;

FIG. 10 shows a perspective plan view of the operator control device according to FIG. 9;

FIG. 12 shows a first perspective view of a connecting unit of the operator control device according to FIG. 10; and FIG. 13 shows a second perspective view of a connecting unit of the operator control device according to FIG. 10.

DETAILED DESCRIPTION OF THE PRESENTLY PREFERRED EMBODIMENTS

Figure 11:
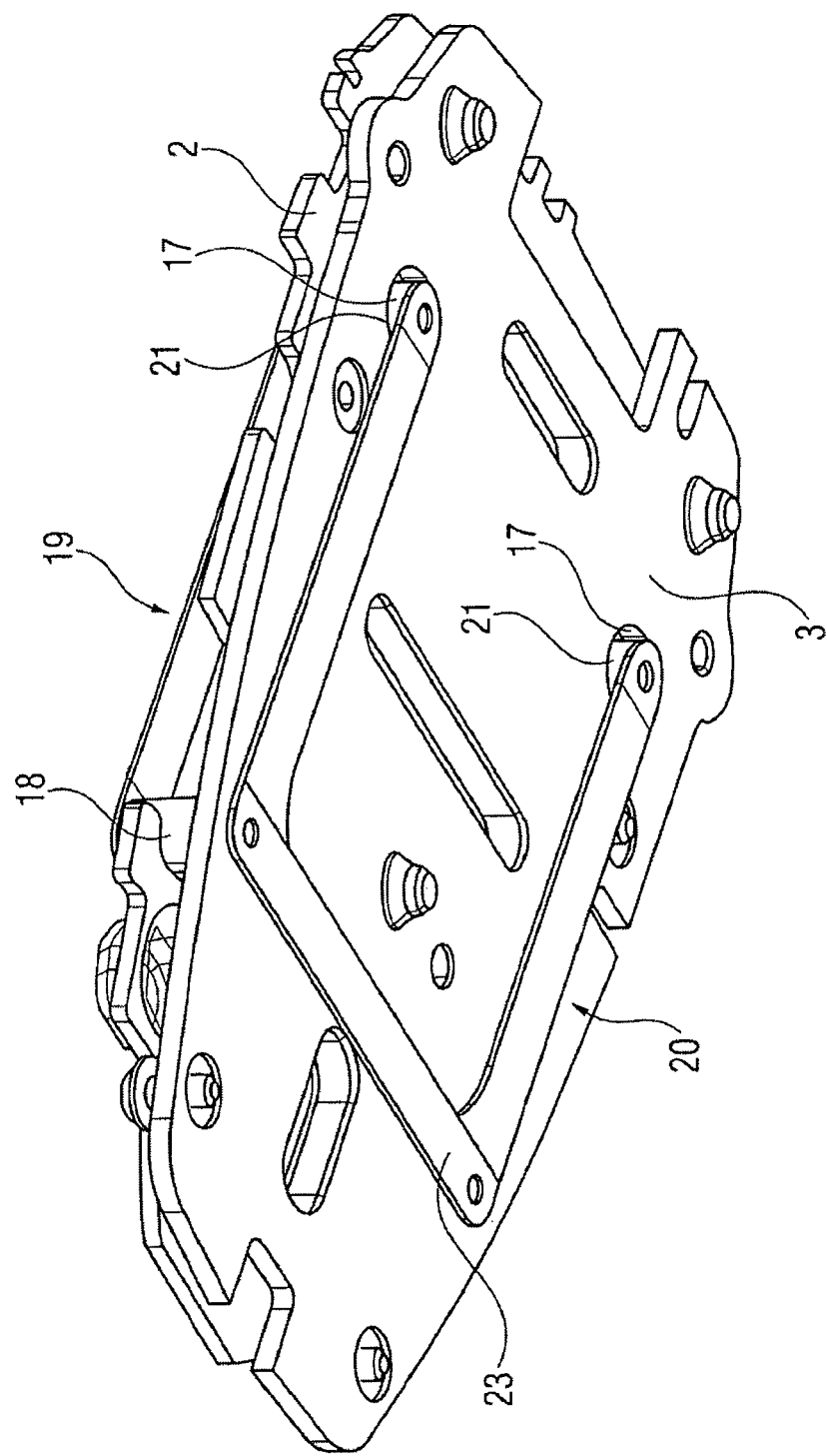
FIG. 11 shows a perspective view from below of the operator control device according to FIG. 9.

The operator control devices as illustrated in the figures have a first planar component 2 which faces an operator 1, is composed of a ferromagnetic material and can move transversely with respect to its planar extent.

Parallel thereto, a second planar component 3, composed of a ferromagnetic material, is arranged in a nonmovable fashion.

The second planar component 3 has coil formers 4, which are at intervals from one another, are directed toward the first planar component 2 and are embodied in one piece with the second planar component 3 (not illustrated in FIGS. 9-13).

The coil formers 4 are each surrounded by a pair of spiral-like flat coils 5, 5'.

The flat coils 5, 5' are printed onto a printed circuit board 6 that extends over the surface of the planar components 2, 3 and is embodied as a ceramic substrate, wherein the flat coils 5 are printed, on the side facing the first planar component 2, onto the printed circuit board 6, and the flat coils 5' are printed, on the side facing the second planar component 3, onto the printed circuit board 6.

The coil formers 4 project through cutouts 7, which are correspondingly formed in the printed circuit board 6.

The printed circuit board 6, which supports the flat coils 5, 5', is adhesively bonded by an adhesive layer 8 onto the surface of the second planar component 3 facing the first planar component 2.

The printed circuit board 6 can, however, also be connected to the second planar component 3 by a screw connection.

For the sake of better clarity, the flat coils 5, 5', the printed circuit board 6 and the adhesive layer 8 are illustrated only in FIG. 1.

In the exemplary embodiment in FIGS. 1 and 2, identical connecting elements 9, constructed from a spring steel sheet as a punched bent part, engage around the first planar component 2 and the second planar component 3 at their edge regions facing one another, the connecting elements 9 having, in their relaxed position illustrated in FIG. 1, a connecting region 11, which is perpendicular with respect to the plane of the planar components 2, 3, and have attachment ends 10, which are directed at the two ends thereof at a right angle toward the connecting regions 11.

The attachment ends 10 are attached to those faces of the first and second planar components 2 and 3 that are remote from one another.

The right-angled junctions of the connecting regions 11 with the attachment ends 10 of the connecting elements 9 that are composed of a spring steel sheet form spring-elastic regions 12.

The spring-elastic regions 12 are without, or without substantial, spring stress in the position of rest illustrated in FIG. 1. If the attachment ends 10 are deflected from their perpendicular alignment with respect to the connecting region by an application of force (FIG. 2), a spring stress builds up in the spring-elastic regions 12, the spring stress moving the connecting elements 9 and the first planar component 2, which is fixedly connected thereto, back into the position of rest after the application of force has ended.

Along their longitudinal edges, the connecting regions 14 have reinforcements 13 which are bent out of the plane of the spring face at a right angle between the spring-elastic regions 12, with the result that the connecting regions 11 are flexurally rigid.

In the exemplary embodiment in FIGS. 3 to 5, the first and second planar components 2 and 3 are connected to one another at their ends lying opposite one another by two identical connecting elements 9' which are constructed from a spring steel sheet as punched bent parts.

In the position of rest illustrated in FIG. 3, the connecting regions 11', provided with reinforcements 13 as in FIGS. 1 and 2, of the connecting elements 9' extend parallel to one another inclined at the same angle with respect to the planes of the first and second planar components 2 and 3, and are attached, by attachment ends 10 that extend parallel to the planar components 2 and 3, to those faces of the planar components 2 and 3 that face one another.

In FIG. 5, the connecting elements 9' are attached by their second attachment ends 10 to the side of the second planar component 3 that faces away from the first planar component 2, and the connecting elements 9' project with their connecting regions 11' with play through openings 17 in the second planar component 3 and in the first planar component 2. The connecting elements 9' are attached by their first attachment ends 10 to the side of the first planar component 2 facing away from the second planar component 3.

The junctions between the connecting region 11' and the attachment ends 10 form, in FIGS. 3 and 4 as in FIGS. 1 and 2, spring-elastic regions 12 which are at least largely free of stress in the position of rest illustrated in FIGS. 3 and 5.

When the connecting elements 9' are deflected out of the position of rest, a spring stress is built up in the spring-elastic regions 12 in the connecting elements 9, which spring stress attempts to return the connecting elements 9' to their position of rest.

FIGS. 6a to 6d show connecting elements 9' in the position of rest with different inclinations. The smaller the inclination the greater the length of the connecting elements 9' and therefore also a robustness with respect to cases of overloading.

In the exemplary embodiment in FIGS. 7 and 8, the first and second planar components 2 and 3 are connected to one another at their ends lying opposite one another by two connecting elements 9", 9''' which are constructed from a spring steel sheet as punched bent parts.

The connecting elements 9", 9''' have attachment ends 10 to which they are attached at those faces of the planar components 2 and 3 that face away from one another.

The attachment ends 10 of each of the connecting elements 9", 9''' are connected to one another by connecting partial regions 14, which have two reinforcements 13.

The two connecting partial regions 14 of each connecting element 9", 9''' are positioned in a V shape with respect to one another and are each connected to an attachment end 10 by their ends which are remote from one another, using spring-elastic regions 12.

At the ends facing one another, the connecting elements 14 are connected to one another via a further spring-elastic region 15.

The "V"s of the connecting elements 9", 9''' are directed in the same direction parallel to the planar components 2 and 3 and are connected to one another at their further spring-elastic regions 15 by a rigid coupling element 16.

In the exemplary embodiment in FIGS. 9 to 13, the first planar component 2 has a first connecting piece 18 to whose end, directed toward the operator 1, the first attachment end 10 of a first connecting element 19 is attached, and to whose end, projecting away from the operator 1, the first attachment end 10 of a second connecting element 20 is attached. The second planar component 3 has a second connecting piece 21 to whose end, projecting away from the operator 1, the second attachment end 10 of the second connecting element 20 is attached, and to whose end, directed toward the operator 1, the second attachment end 10 of the first connecting element 19 is attached.

As in the previous exemplary embodiments, the connecting elements 19 and 20 have connecting regions 11, attachment ends 10, reinforcements 13 and spring-elastic regions 12.

The end of the first connecting piece 18 that projects away from the operator 1 projects here with play through an opening 17 in the second planar component 3, and the end of the second connecting piece 21 that projects toward the operator 1 projects with play through an opening 17 in the first planar component 2.

The first and second connecting pieces 18 and 21 and the first and, second connecting elements 19 and 20 form a first connecting unit 22. An identical connecting unit 22' is arranged parallel to the first connecting unit 22, wherein the two connecting units are connected to one another by three rigid crossmembers 23.

If a sensor system (not illustrated) detects that a finger of the operator 1 touches the first planar component 2, the flat coils 5, 5' are energized.

If the current flows through the flat coils 5, 5', a magnetic flux is impressed in the planar components 2, 3 and therefore a magnetic circuit is closed, with the result that the two planar components 2, 3 are pulled parallel in relation to one another, without touching one another, counter to the force of the spring-elastic regions 12.

When the flow of current through the flat coils 5, 5' ends, the planar components 2, 3 are moved back once again into their position of rest by the spring-elastic regions 12.

In the exemplary embodiments in FIGS. 1 to 5 and 9 to 13, as the planar components 2, 3 move toward one another, simultaneous lateral offsetting of these components 2, 3 occurs, while in the exemplary embodiment in FIGS. 7 and 8 such lateral offsetting does not occur.

The first planar component 2 forms an operator control element at the same time, with the result that the operator senses the movement of the first planar component 2 haptically.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An operator control device comprising:
an operator control element configured to provide haptic feedback to an operator, the operator control element being activatable by an input member of the operator, the operator control element having:
a first planar component; and
a second planar component oriented in parallel with the first planar component, the first and second planar components being movable relative to one another, wherein:

the first and second planar components (2, 3) are guidable between a position of rest and an activation position while maintaining their parallel orientation with respect to one another, in the activation position the distance between the first and second planar components (2, 3) is smaller than in the position of rest, the first and second planar components (2, 3) are spring loaded in the position of rest, the first planar component (2) and the second planar component (3) are connected to one another by first and second connections each having: (a) first and second attachment ends (10), (b) spring-elastic regions (12) proximal to the attachments ends (10), and (c) a connecting region (11, 11') between the attachment ends (10), the spring-elastic regions (12) exerting on the first and second planar components (2, 3) a prestress moving away from one another, the first planar component (2) has as a connection a first connecting piece (18) to whose end directed toward the operator (1) the first attachment end (10) of a first connecting element (19) is attached, and to whose end projecting away from the operator (1) the first attachment end (10) of a second connecting element (20) is attached, and the second planar component (3) has as a connection a second connecting piece (21) to whose end projecting away from the operator (1) the second attachment end (10) of the second connecting element (20) is attached, and to whose end directed toward the operator (1) the second attachment end (10) of the first connecting element (19) is attached.

2. The operator control device as claimed in claim 1, wherein the first and second planar components (2, 3) are configured to be drivable counter to the spring force such that the first and second planar components (2, 3) can be moved from the position of rest to the activation position.

3. The operator control device as claimed in claim 2, wherein the first and second planar components (2, 3) comprise a ferromagnetic material and the operator control device further comprises at least one coil arranged between the first and second planar components (2, 3), the coil being configured such that when it is energized the first and second planar components (2, 3) move with relative planar displacement with respect to one another such that the distance between the first and second planar components (2, 3) is reduced.

4. The operator control device as claimed in claim 3, wherein the coil is a flat coil (5, 5') arranged on a printed circuit board (6).

5. The operator control device as claimed in claim 4, wherein the printed circuit board (6) that supports the flat coil (5, 5') is fixedly arranged on the surface of the second planar component (3) facing the first planar component (2).

6. The operator control device as claimed in claim 5, wherein the printed circuit board (6) is arranged on the second planar component (3) by an adhesive layer (8) or is applied to the second planar component using a film technology.

7. The operator control device as claimed in claim 1, wherein the operator control element is part of a display.

8. The operator control device as claimed in claim 4, wherein the connecting regions (11') extend with a greater incline with respect to the plane of the first and second planar components (2, 3) when the flat coil is not energized than when the flat coil is energized.

9. An operator control device comprising:
an operator control element configured to provide haptic feedback to an operator, the operator control element being activatable by an input member of the operator, the operator control element having:
a first planar component; and
a second planar component oriented in parallel with the first planar component, the first and second planar components being movable relative to one another,
wherein:
the first and second planar components (2, 3) are guidable between a position of rest and an activation position while maintaining their parallel orientation with respect to one another,
in the activation position the distance between the first and second planar components (2, 3) is smaller than in the position of rest,
the first and second planar components (2, 3) are spring loaded in the position of rest,
the first planar component (2) and the second planar component (3) are connected to one another by first and second connections each having: (a) first and second attachment ends (10), (b) spring-elastic regions (12) proximal to the attachments ends (10), and (c) a connecting region (11, 11') between the attachment ends (10),
each of the first and second connections is directly or indirectly attached, at the same distance and in the same direction in the extent of the planes of the first and second planar components (2, 3), to the first planar component (2) by its first attachment end (10) and to the second planar component (3) by its second attachment end (10),
the first and second connections extend parallel to one another between their attachment ends (10),
the first and second connections are each flexurally rigid in the connecting region (11, 11') between the attachment ends (10) such that the spring-elastic regions (12) exert on the first and second planar components (2, 3) a prestress moving away from one another,
the first planar component (2) has as a connection a first connecting piece (18) to whose end directed toward the operator (1) the first attachment end (10) of a first connecting element (19) is attached, and to whose end projecting away from the operator (1) the first attachment end (10) of a second connecting element (20) is attached, and
the second planar component (3) has as a connection a second connecting piece (21) to whose end projecting away from the operator (1) the second attachment end (10) of the second connecting element (20) is attached, and to whose end directed toward the operator (1) the second attachment end (10) of the first connecting element (19) is attached.

10. The operator control device as claimed in claim 9, wherein the end, projecting away from the operator (1), of the first connecting piece (18) projects with play through an opening (17) in the second planar component (3), and the end, projecting toward the operator (1), of the second connecting piece (21) projects with play through an opening (17) in the first planar component (2).

11. The operator control device as claimed in claim 10, further comprising:

a first connecting unit (22) comprising the first and second connecting pieces (18, 21) and the first and second connecting elements (19, 20), an identical second identical connecting unit (22') arranged parallel to the first connecting unit (22), and one or more rigid crossmembers (23), wherein the first connecting elements (19) and/or the second connecting elements (20) of the first and second connecting units (22, 22') are connected to one another by the one or more rigid crossmembers (23).

\* \* \* \* \*